(12) United States Patent
Wang et al.

(10) Patent No.: US 7,461,947 B2
(45) Date of Patent: Dec. 9, 2008

(54) LED TUBE LIGHTS WITH CLEAR BOTTOM BASE

(75) Inventors: Shih Kuei Wang, Ping-Cheng (TW); Chinmau James Hwang, San Jose, CA (US); Chen-Ho Wu, Los Altos Hills, CA (US)

(73) Assignee: Leotek Electronics Corporation, Lung-Tan, Tao-Yuam County (TW)

( * ) Notice: Subject to any disclaimer, the term of this patent is extended or adjusted under 35 U.S.C. 154(b) by 155 days.

(21) Appl. No.: 11/485,040

(22) Filed: Jul. 11, 2006

(65) Prior Publication Data

US 2007/0021026 A1    Jan. 25, 2007

Related U.S. Application Data

(60) Provisional application No. 60/701,827, filed on Jul. 21, 2005.

(51) Int. Cl.
*F21V 1/00* (2006.01)

(52) U.S. Cl. .................. 362/239; 362/240; 362/800

(58) Field of Classification Search .............. 362/219, 362/239, 240, 246, 249, 545, 800
See application file for complete search history.

(56) References Cited

U.S. PATENT DOCUMENTS

| | | | |
|---|---|---|---|
| 6,969,179 B2 * | 11/2005 | Sloan et al. | 362/219 |
| 7,213,941 B2 * | 5/2007 | Sloan et al. | 362/246 |
| 2003/0112627 A1 * | 6/2003 | Deese | 362/249 |

* cited by examiner

*Primary Examiner*—Stephen F Husar
(74) *Attorney, Agent, or Firm*—DLA Piper LLP (US)

(57) ABSTRACT

A high power LED lamp and method for retrofitting conventional traffic signal lamps. The LED lamp includes a housing, a power supply disposed in the housing, a plurality of LEDs mounted to a substantially planar mounting surface in the housing and electrically connected to the power supply for producing diverging light, and a threaded electrical connector extending from the housing. The method includes replacing a convention incandescent light bulb with the LED lamp, and installing a Fresnel lens inside the traffic signal lamp that collimates and just fills and illuminates the outer lens of the traffic signal lamp.

12 Claims, 2 Drawing Sheets

LED TUBE LIGHTS WITH CLEAR BOTTOM BASE

This application claims the benefit of U.S. Provisional Application No. 60/701,827, filed Jul. 21, 2005, and entitled LED Tube Lights with Clear Bottom Base.

FIELD OF THE INVENTION

The present invention relates to the design of a light emitting diode (LED) tube light (LTL) with a see-through bottom, and more particularly to an improved LTL that overcomes the difficulty of identifying appropriate cut locations thereon.

BACKGROUND OF THE INVENTION

LED lamps have been developed to replace conventional incandescent or fluorescent lamps for reducing electrical and maintenance costs, and for increasing reliability. LED lamps consume less electrical energy than conventional lamps while exhibiting much longer lifetimes. Such LED lamps typically include a power supply and a plurality of LEDs mounted on a flat or curved surface.

In the case of LED border tubes, a few LED emitters are generally laid out on a printed circuit board (PCB). While the LED emitters provide adequate illumination on the front cover of the tube, circuitry on the PCB provides the LTL with electrical control. The PCB is typically inserted into an enclosed tube and laid on the bottom base (or back cover) of the enclosure. Most PCBs are constructed to have safe cut locations where the PCB can be cut or severed (to reduce the length of the PCB) without damaging any critical circuitry thereon. The back of the PCB, for example, could have marks made for position identification purposes.

The tube is often made of plastic materials such as Acrylonitrile Butadine Styrene (ABS), Acrylonitrile Styrene Acrylate (ASA), Polystyrene (PS), polycarbonate (PC) etc., wherein the tube front surface is often colored to match the desired display color of the tube. The whole tube is often non-clear, especially when the front cover surface is not a clear one, although some tubes are clear and colorless but do not provide safe cut locations on the PCB that will avoid damage of critical circuits. And although tubes are usually a one-piece enclosure, some tubes are enclosures comprising multiple pieces.

Current LTLs, however, are limited when physical modifications, such as shortening tube length, are required. This difficulty stems primarily from a lack of PCB visibility in the design of traditional LTLs (i.e., LTL designs with colored tubes and non-see-through bottoms) which makes it difficult to locate safe-cut markings on the PCB, especially when the tube light is not turned on. Shortening tube length of traditional LTLs, thus requires markings to be made on the exterior of the LTL. However, because these markings must be made manually, careful measurement is required to ensure the security of the components inside the tube when the LTL is actually severed. Accordingly, there is a need for an LTL with a clear bottom base which provides see-though capability to facilitate a safe cutting of the tube without damaging the circuits therein.

SUMMARY OF THE INVENTION

The present invention solves the aforementioned problems by providing an LED tube light with a clear bottom base.

The LED tube light of the present invention includes a printed circuit board comprising a plurality of LEDs, a plurality of markings on the printed circuit board, wherein these markings identify safe-cut locations for the LED tube light, and an enclosed tube comprising a clear bottom base.

Another aspect of the present invention is a method for manufacturing an LED tube light. This method includes inserting a printed circuit board within an LED tube light, wherein the LED tube light comprises a clear bottom base, and marking a plurality of locations on the printed circuit board, wherein the markings identify safe-cut locations for the LED tube light.

Other objects and features of the present invention will become apparent by a review of the specification, claims and appended figures.

DETAILED DESCRIPTION OF THE PREFERRED EMBODIMENTS

The present invention is an LED tube design with a clear see-through bottom. This improved LTL overcomes the difficulty of identifying appropriate cut locations when physical modifications, such as shortening the length of the tube, are required. Moreover, the present invention minimizes the probability of accidentally damaging an LED tubes by providing adequate visibility of safe-cut locations therein. Such visibility could facilitate an effective and/or efficient inspection job to the position of the PCB inside the tube when necessary. Furthermore, a clear tube bottom provides necessary see-though capability to the inside of the tube from the tube bottom even when the LED light source inside the tube is turned off.

Figure 1A:
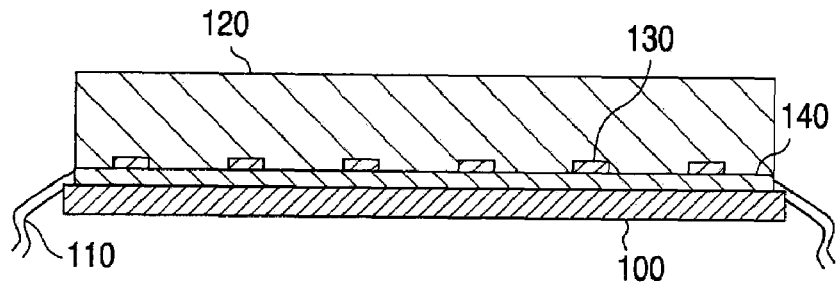
FIG. 1A is a schematic longitudinal cross sectional view from the side of a traditional prior art LTL without a see-through bottom.

In FIG. 1A, a schematic cross section view of a traditional prior art LTL is provided. As illustrated, such an LTL comprises an opaque bottom base 100, electrical wires 110, a tube front cover 120, LEDs 130, and a PC Board (PCB) 140. In this design, LEDs 130 are electrically and physically attached to PCB 140, wherein PCB 140 has the necessary circuitry to control the current flow to individual LEDs 130. A voltage is then applied via electrical wires 110 from one side of the LTL to the other side via each LED 130.

Figure 2A:
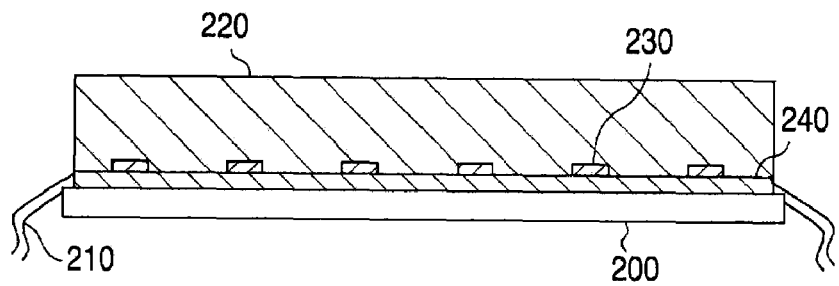
FIG. 2A is a schematic longitudinal cross sectional view from the side of a LTL with a clear-see-through bottom in accordance with the present invention.

In FIG. 2A, a schematic cross section view of an LTL in accordance with a preferred embodiment of the present invention. As illustrated, such an LTL comprises a clear bottom base 200, electrical wires 210, a tube front cover 220, LEDs 230, and a PC Board (PCB) 240. This embodiment is similar to the LTL described in FIG. 1A, except that here bottom base 200 is see-through.

Figure 1B:
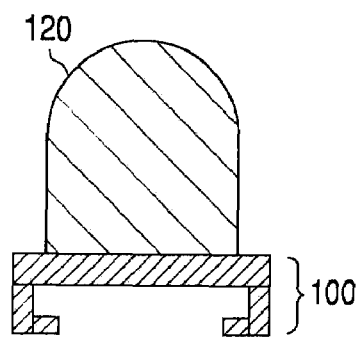
FIG. 1B is a schematic end view of a traditional prior art LTV without a see-through bottom.
Figure 2B:
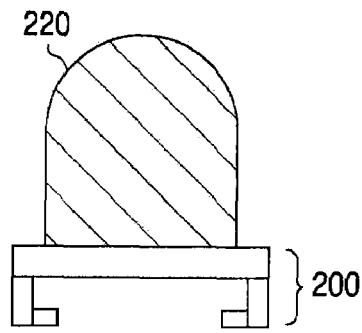
FIG. 2B is a schematic end view of a LTL with a clear-see-through bottom in accordance with the present invention.
Figure 1C:
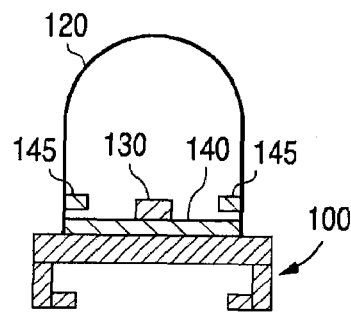
FIG. 1C is a schematic cross sectional view of a traditional prior art LTL with a non-see-through bottom.
Figure 2C:
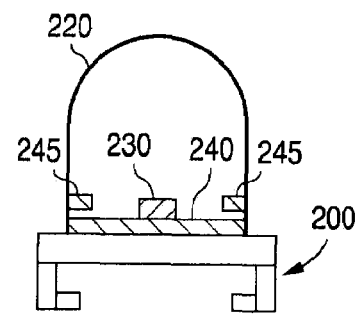
FIG. 2C is a schematic cross sectional view of a LTL with clear-see-through bottom in accordance with the present invention.

FIGS. 1B and 2B, respectively show end views of a traditional LTL and an LTL according to the preferred embodiment of the present invention, and FIGS. 1C and 2C respectively show cross sectional schematics of a traditional LTL and an LTL according to the preferred embodiment of the present invention. As illustrated in FIGS. 1B and 1C, the PCB is located within the cover 120 by PCB guides 145, and the bottom of the PCB 140 is not visible via opaque bottom base 100. In FIGS. 2B and 2C, however, the PCB 240 is located within the cover 220 by PCB guides 245, and the PCB 240 is visible via clear bottom base 200.

Figure 1D:
FIG. 1D is a schematic view of a back of a prior art LTL without a see-through capability.

In FIG. 1D, a schematic view of the bottom of a traditional LTL is provided. As illustrated, traditional LTLs require external cut marks 150 to be made manually on the outside surface of opaque bottom base 100. Moreover, because markings on the back of PCB 140 would not be visible from outside the tube, the cut marks 150 must be made externally on opaque bottom base 100. Within such design, no electrical damage will occur so long as cuts are carefully made at the marked lines. But since PCB 140 is enclosed inside the tube, PCB 140 cannot be seen. Accordingly, these traditional LTLs require very careful measurements in order to accurately identify the safe-cut locations.

Figure 2D:
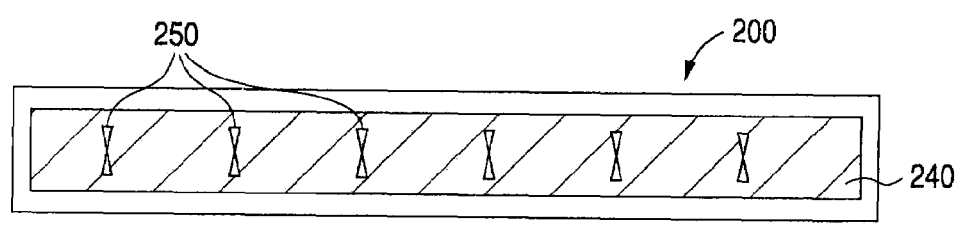
FIG. 2D is a schematic view of the back of a LTL with see-through capability in accordance with the present invention.

The present invention provides an improved LTL design, whereby safe-cut locations may be pre-marked during assembly. FIG. 2D shows a schematic view of the bottom of an LTL according to a preferred embodiment. As illustrated, because the bottom of this LTL design comprises clear see-through bottom base 200, cut marks 250 on the back of PCB 240 are visible from outside the tube. Therefore, when it is necessary to cut the tube, a safe cut can be ensured if the cut marks are followed, and the circuits on either side of the cut will continue to operate. And because no external cut marks are necessary, safe-cut marks 250 can be made through automation when PCB 240 is fabricated.

The present invention thus allows for LTL PCBs to be visible via a clear bottom base. The advantages of the present invention include: 1) that LTLs can be safely cut when physical modification is required, and 2) that cut marks can be made during LTL fabrication, as opposed to manually after fabrication.

It is to be understood that the present invention is not limited to the embodiment(s) described above and illustrated herein, but encompasses any and all variations falling within the scope of the appended claims.

What is claimed is:

1. An LED tube light, comprising:
    a printed circuit board comprising a plurality of LEDs;
    a plurality of markings on said printed circuit board, wherein said markings identify safe cut locations of said LED tube light and wherein with a cut at said safe cut locations the circuits on either side of the cut will continue to operate; and
    a tube comprising a clear bottom base, wherein the printed circuit board is configured within the tube such that the plurality of markings are visible via the clear bottom base.

2. The LED tube light of claim 1, wherein said printed circuit board is oriented in said tube such that said plurality of markings are visible via said clear bottom base.

3. The LED tube light of claim 2, wherein said plurality of markings are visible when said LED tube light is off.

4. The LED tube light of claim 2, wherein said plurality of markings are visible when said LED tube light is on.

5. The LED tube light of claim 1, wherein said plurality of markings are marked before said printed circuit board is inserted into said tube.

6. The LED tube light of claim 1, wherein said safe cut locations identify locations whereby said printed circuit board may be cut without damaging the circuitry of said printed circuit board.

7. A method for manufacturing an LED tube light, comprising:
    inserting a printed circuit board within an LED tube light, wherein said LED tube light comprises a clear bottom base; and
    marking a plurality of locations on said printed circuit board, wherein the printed circuit board is configured within the tube such that the plurality of markings are visible via the clear bottom base, said markings identifying safe cut locations of said LED tube light, and wherein with a cut at said safe cut locations the circuits on either side of the cut will continue to operate.

8. The method of claim 7, wherein said printed circuit board is oriented such that said plurality of markings are visible via said clear bottom base.

9. The method of claim 8, wherein said plurality of markings are visible when said LED tube light is off.

10. The method of claim 8, wherein said plurality of markings are visible when said LED tube light is on.

11. The method of claim 7, wherein said plurality of markings are marked before said printed circuit board is inserted into said tube.

12. The method of claim 7, wherein said safe cut locations identify locations whereby said printed circuit board may be cut without damaging the circuitry of said printed circuit board.

* * * * *